(12) United States Patent
Jang et al.

(10) Patent No.: US 9,146,428 B2
(45) Date of Patent: Sep. 29, 2015

(54) LIQUID CRYSTAL DISPLAY DEVICE HAVING A RECESSED PORTION AND A SPACER IN THE RECESSED PORTION

(71) Applicant: SAMSUNG DISPLAY CO., LTD., Yongin, Gyeonggi-Do (KR)

(72) Inventors: Chang-Soon Jang, Seoul (KR); Soo-Hye Ryu, Yongin-si (KR); YiSeop Shim, Suwon-si (KR); Chul Huh, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 206 days.

(21) Appl. No.: 13/772,560

(22) Filed: Feb. 21, 2013

(65) Prior Publication Data

US 2014/0009728 A1   Jan. 9, 2014

(30) Foreign Application Priority Data

Jul. 4, 2012 (KR) .......................... 10-2012-0072886

(51) Int. Cl.
| | | |
|---|---|---|
| *G02F 1/1339* | (2006.01) | |
| *G02F 1/1335* | (2006.01) | |
| *G02F 1/1368* | (2006.01) | |
| *G02F 1/1362* | (2006.01) | |
| *G02F 1/1333* | (2006.01) | |

(52) U.S. Cl.
CPC .......... *G02F 1/13394* (2013.01); *G02F 1/1368* (2013.01); *G02F 1/133345* (2013.01); *G02F 1/133514* (2013.01); *G02F 1/136213* (2013.01)

(58) Field of Classification Search
CPC .............. G02F 1/13394; G02F 1/1339; G02F 1/13392; G02F 2001/13396; G02F 2001/13398; G02F 1/133345; G02F 1/1368; G02F 1/136213

USPC ................ 349/155, 156, 38, 42, 43, 138
See application file for complete search history.

(56) References Cited

U.S. PATENT DOCUMENTS

| | | | |
|---|---|---|---|
| 7,492,435 B2 * | 2/2009 | Jeon ............................... | 349/155 |
| 7,557,896 B2 * | 7/2009 | Wu et al. ....................... | 349/156 |
| 7,619,711 B2 * | 11/2009 | Liu et al. ....................... | 349/156 |
| 7,812,918 B2 | 10/2010 | Choi et al. | |
| 7,852,448 B2 * | 12/2010 | Shirasaka et al. .............. | 349/155 |
| 7,884,917 B2 * | 2/2011 | Sun ............................... | 349/157 |
| 2006/0226426 A1 | 10/2006 | Park et al. | |
| 2008/0123007 A1 * | 5/2008 | Cui et al. ......................... | 349/43 |
| 2009/0033842 A1 | 2/2009 | Yu et al. | |

(Continued)

FOREIGN PATENT DOCUMENTS

| | | |
|---|---|---|
| KR | 1020060070873 A | 6/2006 |
| KR | 1020070079836 A | 8/2007 |

(Continued)

*Primary Examiner* — Paisley L Arendt
(74) *Attorney, Agent, or Firm* — Cantor Colburn LLP

(57) ABSTRACT

A liquid crystal display device includes a first substrate, a second substrate, and a liquid crystal layer disposed between the first substrate and the second substrate. The second substrate includes a buffer layer, and the buffer layer includes a recessed portion. A spacer is disposed between the first substrate and the second substrate, such that a portion of the spacer is extended into the recessed portion. A bottom surface of the recessed portion contacts an upper surface of the spacer. A shortest line crossing a center of the bottom surface of the recessed portion is longer than a longest line crossing a center of the upper surface of the spacer, by about 14 micrometers to about 20 micrometers.

16 Claims, 8 Drawing Sheets

(56) References Cited

U.S. PATENT DOCUMENTS

2009/0310050 A1* 12/2009 Shin et al. ............... 349/39
2012/0120337 A1* 5/2012 Ji et al. ................... 349/39

FOREIGN PATENT DOCUMENTS

| | | | |
|---|---|---|---|
| KR | 1020080023020 A | 3/2008 |
| KR | 1020080050049 A | 6/2008 |
| KR | 1020080081674 A | 9/2008 |
| KR | 1020090000947 A | 1/2009 |
| KR | 1020100079089 A | 7/2010 |
| KR | 101056012 B1 | 8/2011 |
| KR | 101097610 B1 | 12/2011 |

* cited by examiner

LIQUID CRYSTAL DISPLAY DEVICE HAVING A RECESSED PORTION AND A SPACER IN THE RECESSED PORTION

This application claims priority to Korean Patent Application No. 10-2012-0072886, filed on Jul. 4, 2012, and all the benefits accruing therefrom under 35 U.S.C. §119, the contents of which are hereby incorporated by reference.

BACKGROUND

1. Field

The disclosure relates to a liquid crystal display device. More particularly, the disclosure relates to a liquid crystal display device capable of improving an image display quality.

2. Description of the Related Art

A liquid crystal display device is a thin display device that includes two substrates, and a liquid crystal layer disposed between the two substrates. The liquid crystal display device includes two polarizing plates and a backlight unit that generates light. The liquid crystal layer includes liquid crystal molecules.

The liquid crystal display device includes a spacer disposed between the two substrates. The spacer maintains a distance between the two substrates and absorbs external impacts applied to the two substrates.

In general, external contacts occur on an upper substrate of the two substrates. When the external contacts occur on the upper substrate, an original position of the spacer is changed. After the external contacts are removed, the spacer should return to the original position before the external contacts occur.

Due to the change of the position of the spacer, an alignment layer disposed on the upper substrate is damaged. Accordingly, the liquid crystal molecules are not properly controlled due to the damaged alignment layer. Consequently, a light leakage occurs in an area corresponding to the damaged portion of the alignment layer.

In addition, when the spacer does not return to the original position, the liquid crystal molecules disposed adjacent to the spacer are not properly controlled. As a result, the light leakage occurs around the spacer.

SUMMARY

One or more exemplary embodiment of the invention provides a liquid crystal display device capable of reducing or effectively preventing a light leakage, and improving durability.

One or more exemplary embodiment of the invention provides a liquid crystal display device including a first substrate, a second substrate facing the first substrate, a buffer layer, a spacer and a liquid crystal layer. The second substrate includes the buffer layer and the buffer layer is provided with a recessed portion. The spacer is disposed between the first substrate and the second substrate and partially extends into the recessed portion. The liquid crystal layer is disposed between the first substrate and the second substrate.

According to one or more exemplary embodiment, a bottom surface of the recessed portion makes contact with an upper surface of the spacer, and a shortest line crossing a center of the bottom surface of the recessed portion is longer than a longest line crossing a center of the upper surface of the spacer by about 14 micrometers to about 20 micrometers. The upper surface of the spacer makes contact with the bottom surface of the recessed portion, and a border of the bottom surface of the recessed portion is spaced apart from a border of the upper surface of the spacer by about 7 micrometers to about 10 micrometers.

The spacer includes a lower surface disposed on the first substrate, and the spacer may have a truncated cone shape or a truncated polypyramid shape in which an area of the lower surface is greater than an area of the upper surface.

The bottom surface of the recessed portion may have a similar shape to the upper surface of the spacer.

The recessed portion may include a sidewall inclined to the bottom surface of the recessed portion.

A center of the upper surface of the spacer may coincide with a center of the bottom surface of the recessed portion.

The buffer layer may include a black matrix which includes an opening corresponding to a pixel disposed on the first substrate, and a color filter layer which covers the black matrix.

The recessed portion may extend into the color filter layer, and a portion of the color filter layer adjacent to the recessed portion may be overlapped with the black matrix. An exposed portion of the black matrix may be the bottom surface of the recessed portion, and the portion of the color layer adjacent to the recessed portion may be a sidewall of the recessed portion.

According to one or more exemplary embodiment discussed above, the spacer of the liquid crystal display device is not easily deviated from an original position thereof, thereby reducing or effectively preventing light leakage. In addition, although the position of the spacer is changed by external impacts, the spacer may easily return to the original position, to thereby reduce or effectively prevent the light leakage.

The spacer may be attached to the insulating layer disposed on the first substrate on which no external contact occurs. The spacer has the truncated cone shape or the truncated polypyramid shape. The contact area between the spacer and the insulating layer is increased, and the durability of the spacer is improved. Thus, impact absorbance of the liquid crystal display device may be improved.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

Figure 1:
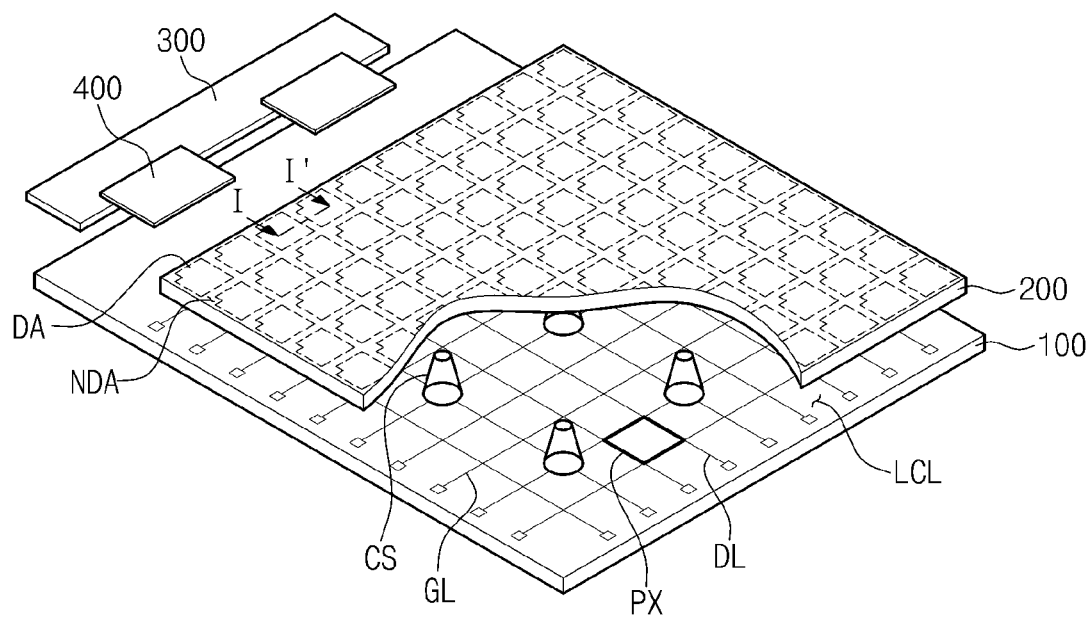
FIG. 1 is a perspective view showing an exemplary embodiment of a liquid crystal display device according to the invention.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" relative to other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 2:
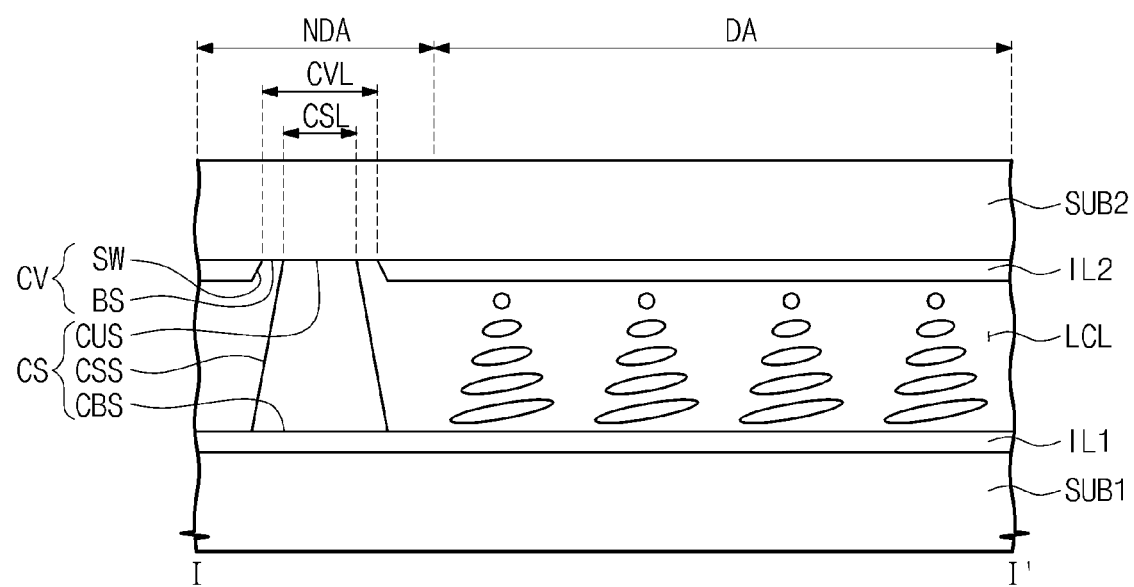
FIG. 2 is a cross-sectional view taken along line I-I' shown in FIG. 1.
Figure 3A:
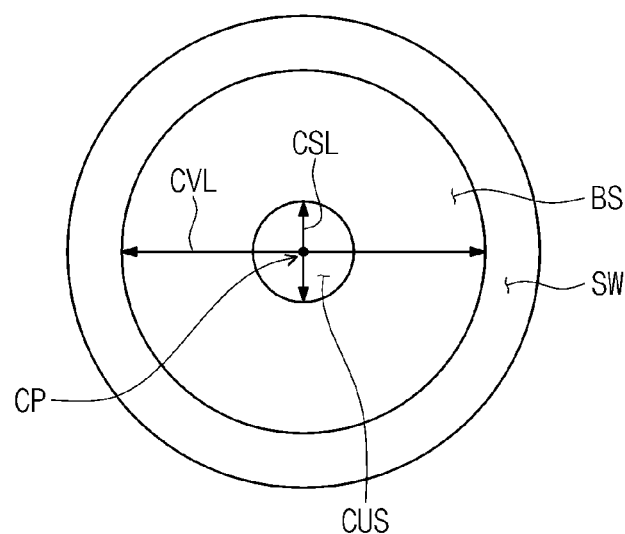
FIGS. 3A to 3C are views showing exemplary embodiments of a relationship between an upper surface of a spacer and a bottom surface of a recessed portion of a liquid crystal display device according to the invention.
Figure 3B:
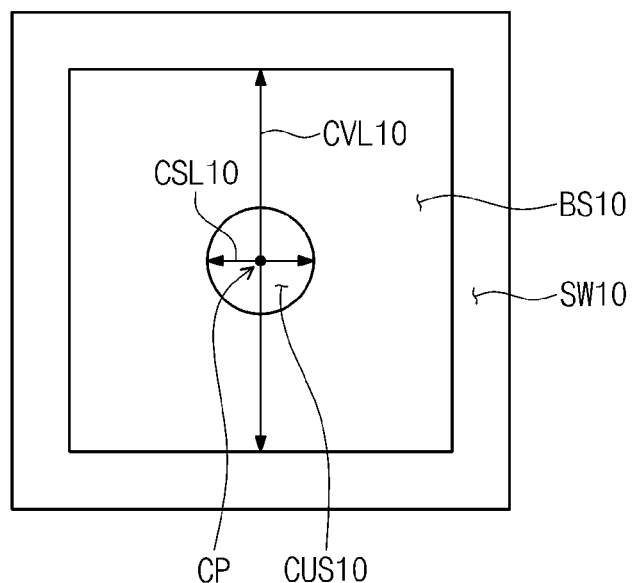
Figure 3C:
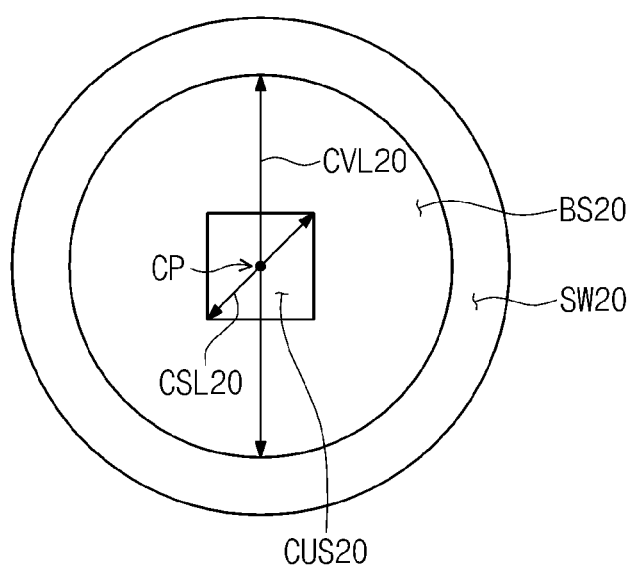

FIG. 1 is a perspective view showing an exemplary embodiment of a liquid crystal display device according to the invention. FIG. 2 is a cross-sectional view taken along line I-I' shown in FIG. 1. FIGS. 3A to 3C are views showing exemplary embodiments of a relationship between an upper surface of a spacer and a bottom surface of a recessed portion of a liquid crystal display device according to the invention.

The liquid crystal display device includes a liquid crystal display panel that displays an image, and a driver that drives the liquid crystal display panel. In addition, the liquid crystal display device includes polarizing plates respectively disposed at upper and lower portions of the liquid crystal display panel, and a backlight unit disposed under the liquid crystal display panel.

Referring to FIG. 1, the liquid crystal display panel includes a first substrate 100, a second substrate 200 facing the first substrate 100, a liquid crystal layer LCL disposed between the first substrate 100 and the second substrate 200, and a spacer CS disposed between the first substrate 100 and the second substrate 200.

The first substrate 100 includes a gate line GL and a data line DL. The gate line GL and/or the data line DL may be provided in plural. The gate lines GL receive gate signals and the data lines DL receive data voltages.

The gate lines GL are insulated from the data lines DL while crossing the data lines DL. In one exemplary embodiment, for instance, the gate lines GL are disposed on and/or in a layer of the liquid crystal display panel different from a layer of the liquid crystal display panel on and/or in which the data lines are disposed. An organic layer or an inorganic layer is disposed between the gate lines GL and the data lines DL.

In addition, the first substrate 100 includes a pixel PX. The pixel PX may be provided in plural. Each of the pixels PX is connected to a corresponding gate line of the gate lines GL and a corresponding data line of the data lines DL.

Although not shown in figures, each of the pixels PX includes a thin film transistor connected to a corresponding gate line of the gate lines GL and a corresponding data line of the data lines DL, and a liquid crystal capacitor connected to the thin film transistor.

The second substrate 200 includes a transmission area DA through which the light from the backlight unit transmits, and a non-transmission area NDA surrounding the transmission area DA. The transmission DA and/or the non-transmission area NDA may be provided in plural.

The transmission areas DA are disposed to correspond to the pixels PX, respectively. The non-transmission area NDA is disposed to correspond to a boundary between the pixels PX. In detail, the non-transmission area NDA is overlapped with the gate lines GL and the data lines DL in a plan view of the liquid crystal display panel.

The spacer CS maintains a distance between the first substrate 100 and the second substrate 200 and absorbs external impacts. The spacer CS may be provided in a plural number, and the spacers CS may be arranged at regular intervals.

Although not shown in figures, the driver includes a timing controller, a gate driver and/or a data driver. The timing controller receives an input image signal, and outputs an image data converted based on an operation mode of the liquid crystal display panel and various control signals.

The gate driver applies the gate signals to the gate lines GL. The data driver converts the converted image data to the data voltages and applies the data voltages to the data lines DL.

The timing controller may be disposed on a printed circuit board 300, but is not limited thereto or thereby. The data driver may be connected to the first substrate 100 in the form of a tape carrier package 400, but is not limited thereto or thereby. The gate driver is connected to the first substrate 100 in the form of the tape carrier package 400 or is directly disposed on the first substrate 100.

As shown in FIG. 2, the first substrate 100 includes a first base substrate SUB1, and an insulating layer IL1 disposed on the first base substrate SUB1. The insulating layer IL1 may include a plurality of layers, such as including organic and/or inorganic layers. Although not shown in figures, among the layers, the gate lines GL are disposed on and/or in a different layer of the liquid crystal display panel from a layer on which the data lines DL are disposed.

The second substrate 200 includes a second base substrate SUB2, and a buffer layer IL2 disposed on the second substrate SUB2. The buffer layer IL2 may include a plurality of layers, but is not limited thereto or thereby. In one exemplary embodiment, for instance, the buffer layer IL2 includes a color filter layer and a black matrix. The color filter layer has a red, green or blue color according to an area or position in the liquid crystal display panel.

The buffer layer IL2 is provided with a recessed portion CV on the second base substrate SUB2. In an exemplary embodiment of forming the liquid crystal display panel, the recessed portion CV is formed by partially removing the buffer layer IL2. As shown in FIG. 2, the recessed portion CV penetrates completely through the buffer layer IL2 such that the second base substrate SUB2 is exposed, but should not be limited thereto or thereby. That is, in an alternative exemplary embodiment, the recessed portion CV may extend partially into a thickness of the buffer layer IL2 such that the second base substrate SUB2 is not exposed through the recessed portion CV.

The recessed portion CV includes a bottom surface BS and a sidewall SW. The bottom surface BS of the recessed portion CV substantially corresponds to a portion of a surface of the second substrate SUB2 exposed through the recessed portion CV. The sidewall SW of the recessed portion CV corresponds to an inner surface of the buffer layer IL2. Where the recessed portion CV extends partially into a thickness of the buffer layer IL2, the bottom surface BS of the recessed portion CV may be may be a portion of a surface of the buffer layer IL2 exposed through the recessed portion CV.

In an alternative exemplary embodiment where an intermediate layer (not shown) is disposed between the buffer layer IL2 and the second base substrate SUB2, the bottom surface BS of the recessed portion CV may be a portion of a surface of the intermediate layer exposed through the recessed portion CV.

The liquid crystal layer LCL is disposed between the insulating layer IL1 and the buffer layer IL2 and includes liquid crystal molecules.

A portion of the spacer CS is in the recessed portion CV. The spacer CS includes an upper surface CUS, a lower surface CBS, and a side surface CSS connecting the upper surface CUS and the lower surface CBS to each other. The lower surface CBS of the spacer CS has a planar area greater than that of the upper surface CUS of the spacer CS, in the plan view of the liquid crystal display panel. In one exemplary embodiment, for instance, the spacer CS has a truncated cone cross-sectional shape (an oval truncated cone shape) or a truncated polypyramid shape, but is not limited thereto or thereby.

The spacer CS is attached to the insulating layer IL1 of the first substrate 100. That is, the lower surface CBS of the spacer CS is attached on an upper surface of the insulating layer IL1. Since the spacer CS is attached to the insulating layer IL1, a position of the spacer CS is fixed and movement of the spacer CS with respect to the insulating layer IL1 is restricted or effectively prevented. The upper surface CUS of the spacer CS makes contacts with the bottom surface BS of the recessed portion CV. The spacer CS is in the recessed portion CV while the first substrate 100 and the second substrate 200 are coupled with each other.

The planar area of the upper surface CUS of the spacer CS is smaller than a planar area of the bottom surface BS of the recessed portion CV, in the plan view of the liquid crystal display panel. Thus, the spacer CS is easily and precisely inserted into the recessed portion CV.

Referring to FIG. 3A, the bottom surface BS of the recessed portion CV has a shape similar to that of the upper surface CUS of the spacer CS. As shown in FIG. 3A, a center of the bottom surface BS of the recessed portion CV coincides and/or aligns with a center of the upper surface CUS of the spacer CS, at a first point CP.

In addition, FIG. 3A shows a shortest line CVL crossing the center of the bottom surface BS of the recessed portion CV of all the lines crossing the center of the bottom surface BS of the recessed portion CV, and a longest line CSL crossing the center of the upper surface CUS of the spacer CS of all the lines crossing the center of the upper surface CUS of the spaces CS.

The shortest line CVL of the bottom surface BS of the recessed portion CV is longer than the longest line CSL of the upper surface CUS of the spacer CS. In one exemplary embodiment, the longest line CVL of the bottom surface BS of the recessed portion CV may be longer by about 14 micrometers to about 20 micrometers. A border or edge of the bottom surface BS of the recessed portion CV is spaced apart from a border or edge of the upper surface CUS of the spacer CS. In one exemplary embodiment, the bottom surface BS of the recessed portion CV may be spaced apart by about 7 micrometers to about 10 micrometers. The distance of about 7 micrometer to about 10 micrometers between the border of the bottom surface BS of the recessed portion CV and the border of the upper surface CUS of the spacer CS indicates a shortest distance between the border of the bottom surface BS of the recessed portion CV and the border of the upper surface CUS of the spacer CS.

In order to precisely insert a portion of the spacer CS attached to the first substrate 100 into the recessed portion CV of the second substrate 200, the following three matters are required to be considered. First, the spacer CS is required to be located at a target position on the insulating layer IL1 of the first substrate 100. In this case, an error of about 4 micrometers to about 6 micrometers may occur such that the portion of the spacer CS may be precisely inserted into the recessed portion CV. Second, the recessed portion CV is required to be formed at a target position on the second base substrate SUB2 of the second substrate 200. In this case, an error of about 4 micrometers to about 6 micrometers may occur such that the portion of the spacer CS may be precisely inserted into the recessed portion CV. Third, a misalignment of about 6 micrometers to about 8 micrometers may occur while the first substrate 100 and the second substrate 200 are coupled to each other such that the portion of the spacer CS may be precisely inserted into the recessed portion CV.

A difference between a length the shortest line CVL and a length of the longest line CSL is required to precisely insert the portion of the spacer CS into the recessed portion CV even though the error occurs. In one exemplary embodiment, for instance, when the longest line CSL has a length of about 6 micrometers, the shortest line CVL has a length of about 20 micrometers to about 26 micrometers.

Referring to FIGS. 3B and 3C, the recessed portion CV includes a bottom surface BS10 and BS20, and a sidewall SW10 and SW20 respectively. The bottom surfaces BS10 and BS20 may have different shapes in the plan view from upper surfaces CUS10 and CUS20. As shown in FIG. 3B, the bottom surface BS10 has a square shape and the upper surface CUS10 has a circular shape. In addition, as shown in FIG. 3C, the bottom surface BS20 has the circular shape and the upper surface CUS20 has the square shape.

Although the bottom surfaces BS10 and BS20 have the different shapes from those of the upper surfaces CUS10 and CUS20, respectively, shortest lines CVL10 and CVL20 of the bottom surfaces BS10 and BS20 are longer than longest lines CSL10 and CSL20 of the upper surfaces CUS10 and CUS20, respectively. In one exemplary embodiment, the shortest lines CVL10 and CVL20 of the bottom surfaces BS10 and BS20 are longer by about 14 micrometers to about 20 micrometers.

Figure 4:
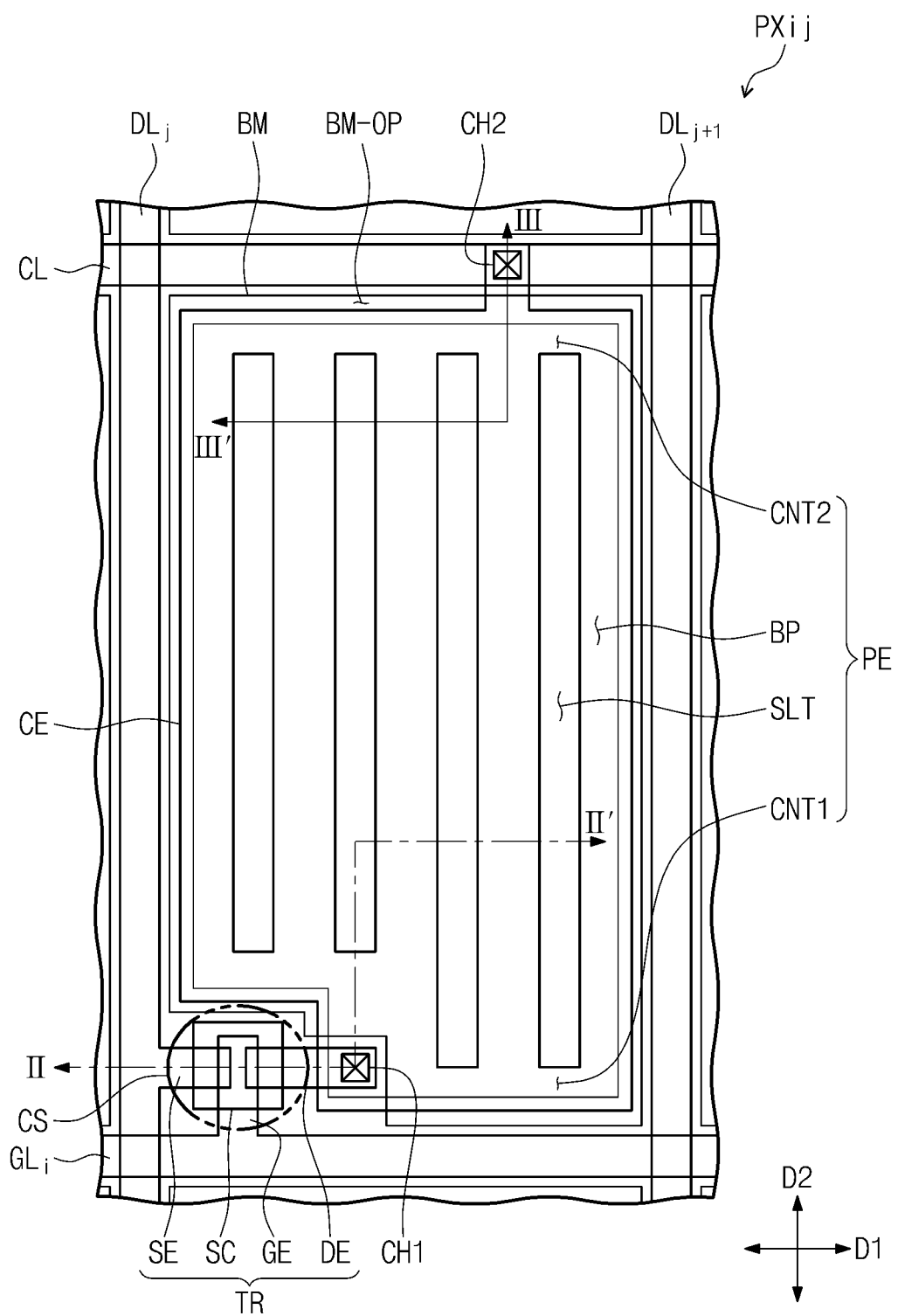
FIG. 4 is a plan view showing an exemplary embodiment of a pixel according to the invention.
Figure 5A:
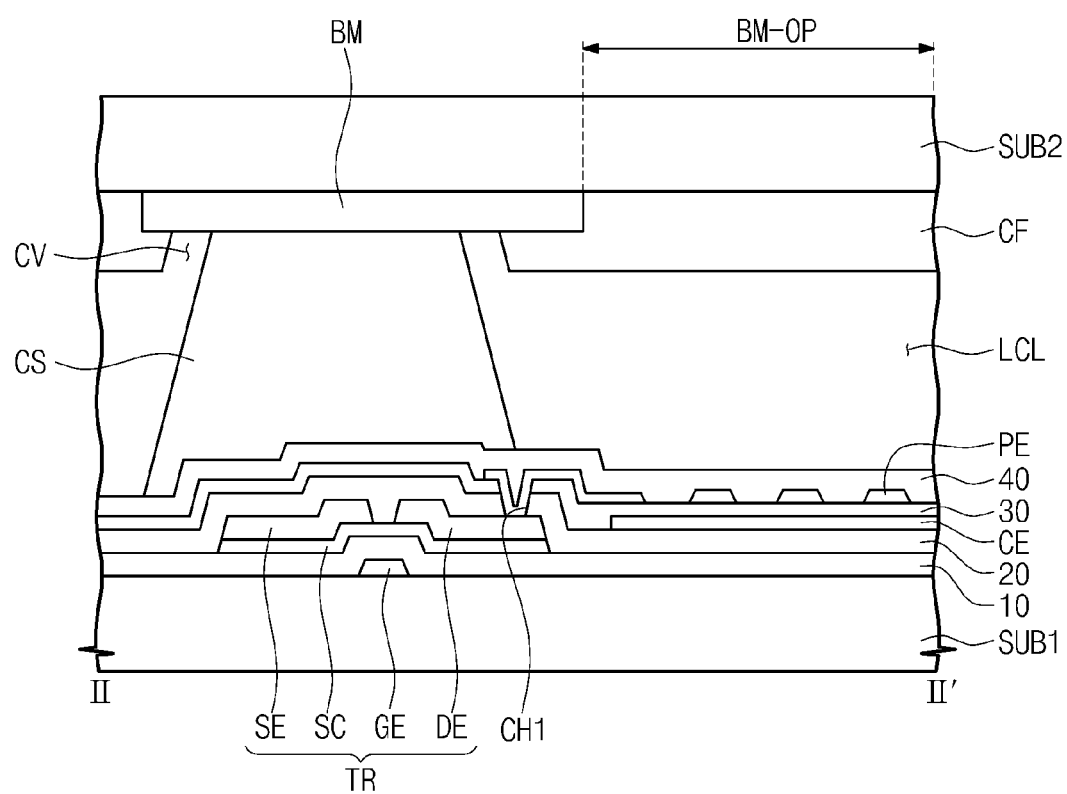
FIG. 5A is a cross-sectional view taken along line II-II' of FIG. 4.
Figure 5B:
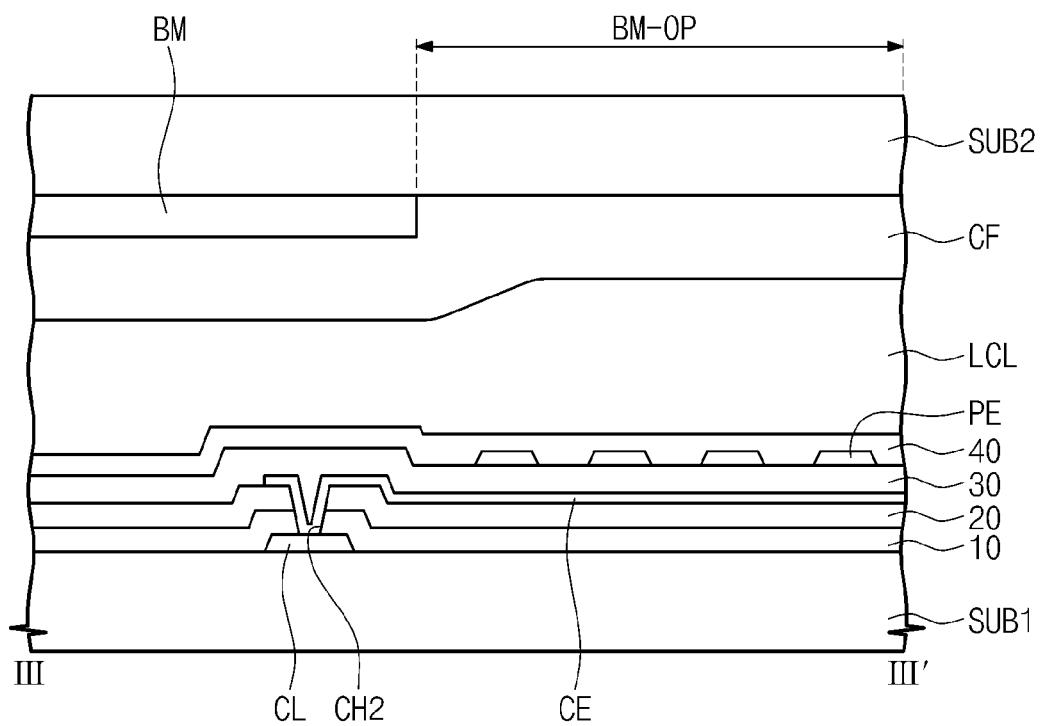
FIG. 5B is a cross-sectional view taken along line III-III' of FIG. 4.

FIG. 4 is a plan view showing an exemplary embodiment of a pixel according to the invention, FIG. 5A is a cross-sectional view taken along line II-II' of FIG. 4, and FIG. 5B is a cross-sectional view taken along line III-III' of FIG. 4. FIG. 4 shows a plan view of the first substrate 100, and a plan view of the black matrix BM disposed on the second substrate 200.

FIGS. 4, 5A, 5B show a pixel configured to have a horizontal switching mode, but should not be limited thereto or thereby. That is, in an alternative exemplary embodiment, the pixel may be configured to have a vertical alignment mode or a twisted nematic mode.

Referring to FIG. 4, a pixel PXij includes a first electrode PE, a second electrode CE insulated from the first electrode PE, and a thin film transistor TR that applies a data voltage to the first electrode PE. In one exemplary embodiment, the pixel PXij may correspond to the gate lines GLi and the data lines DLj, but is not limited thereto or thereby.

The thin film transistor TR is connected to a corresponding gate line GLi and a corresponding data line DLj. The thin film transistor TR includes a gate electrode GE, a source electrode SE, a drain electrode DE and a semiconductor layer SC.

The first electrode PE includes a plurality of slits SLT, and a plurality of branch portions BP alternately arranged with the slits SLT in a first direction D1. Each of the slits SLT and the branch portions BP have a substantially longitudinal axis which extends in a section direction D2. The first and second directions D1 and D2 may be perpendicular to each other, but are not limited thereto or thereby. First ends of the branch portions BP are connected to each other by a first connection portion CNT1, and second ends of the branch portions BP are connected to each other by a second connection portion CNT2. The first connection portion CNT1 is connected to the thin film transistor TR through a first contact hole CH1. In an alternative exemplary embodiment, the second connection portion CNT2 may be omitted and second ends of the branch portions BP may not be connected to each other.

Figure 6A:
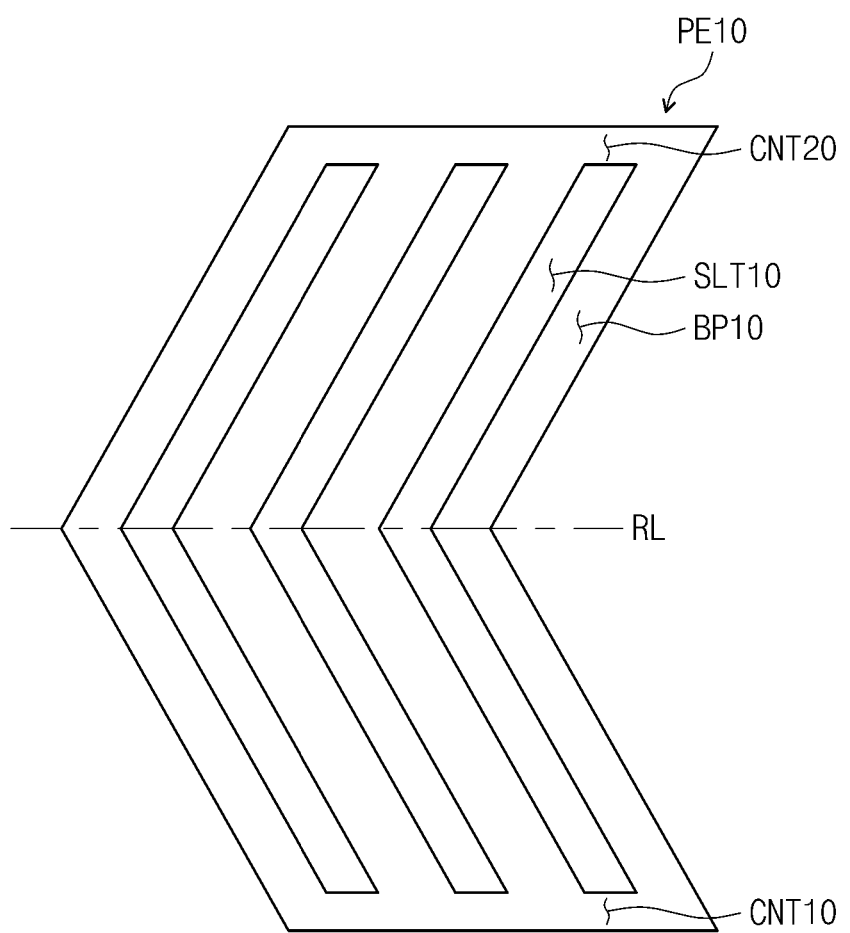
FIGS. 6A and 6B are plan views showing exemplary embodiments of pixel electrodes according to the invention.
Figure 6B:
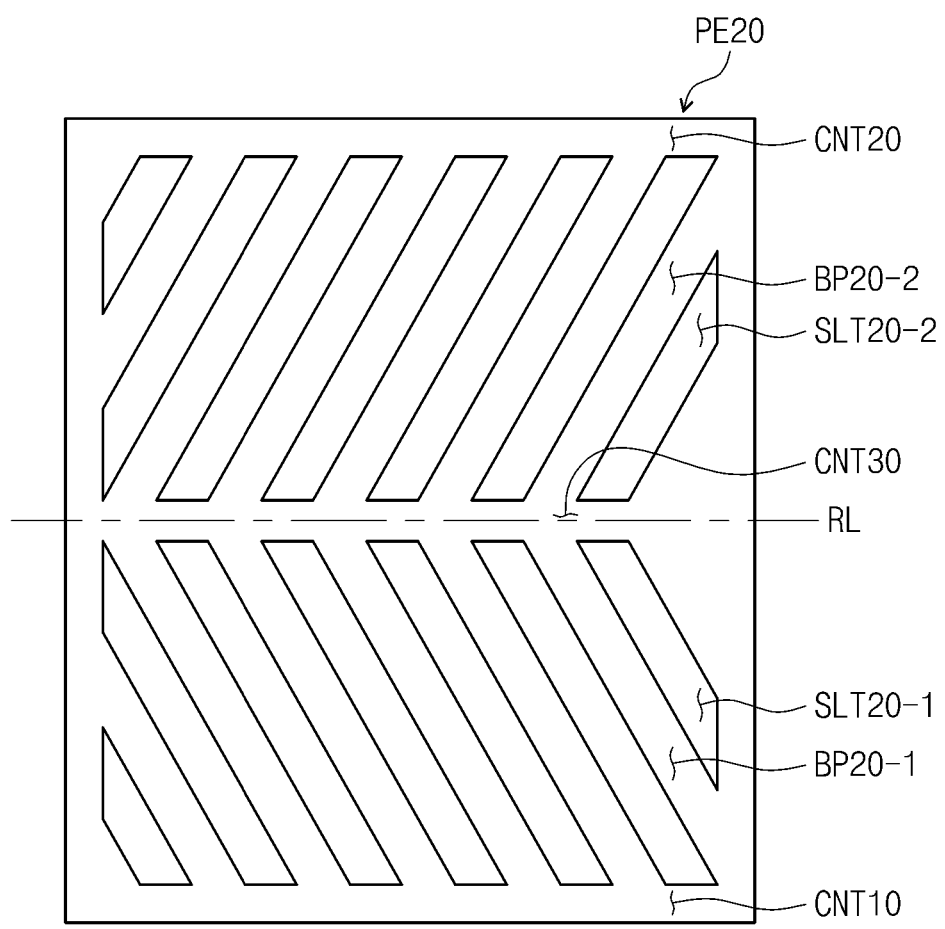

The first electrode PE has may have various planar shapes as shown in FIGS. 6A and 6B.

FIGS. 6A and 6B are plan views showing exemplary embodiments of a pixel electrode according to the invention.

Referring to FIG. 6A, the first electrode PE10 is bent with respect to a reference line RL crossing a transverse center of the first electrode PE10. The first electrode PE10 is divided into a first area and a second area by the reference line RL. The slits SLT10 between branch portions BP10 in the first area are inclined at a different angle to the reference line RL from that of the slits SLT10 between the branch portions BP10 in the second area to the reference line RL.

The branch portions BP10 and the slits SLT10 of first electrode PE10 are continuous from the first area to the second area across the reference line RL. A first connection portion CNT10 in the first area of the first electrode PE10 connects first ends of the branch portions BP10. Similarly, a second connection portion CNT20 in the second area of the first electrode PE10 connects second ends of the branch portions BP10.

Referring to FIG. 6B, the first electrode PE20 includes slits SLT20-1 and SLT20-2 and branch portions BP20-1 and BP20-2. The slits SLT20-1 and SLT20-2 include first slits SLT20-1 and second slits SLT20-2. The first slits SLT20-1 are located below a reference line RL crossing the first electrode PE20 and the second slits SLT20-2 are located above the reference line RL. In other words, the first slits SLT20-1 and the second slits SLT20-2 are located at lower and upper portions of the first electrode PE20 with respect to a third connection portion CNT30 overlapped with the reference line RL, respectively.

The branch portions BP20-1 and BP20-2 and the slits SLT20-1 and SLT20-2 of first electrode PE20 are discontinuous and separated with respect to the reference line RL. First ends of the branch portions BP20-1 and BP20-2 are disposed at the reference line RL. The third connection portion CNT30 connects the first ends of the branch portions BP20-1 and BP20-2 to each other. A first connection portion CNT10 in the first area of the first electrode PE20 connects second ends of the branch portions BP20-1. Similarly, a second connection portion CNT20 in the second area of the first electrode PE20 connects second ends of the branch portions BP20-2.

Referring to back FIG. 4, the second electrode CE is connected to a common line CL through a second contact hole CH2. The common line CL receives a reference voltage different from the data voltage. When the second electrode CE and the first electrode PE are applied with driving voltages, a fringe field is formed between the second electrode CE and the first electrode PE.

Due to the fringe filed, an arrangement of the liquid crystal molecules in the liquid crystal layer LCL is changed. The changed arrangement of the liquid crystal molecules is maintained during a predetermined time period. In detail, the second electrode CE and the first electrode PE form the liquid crystal capacitor, and the arrangement of the liquid crystal molecules is maintained during the time period by a voltage charged in the liquid crystal capacitor.

The second substrate 200 includes the black matrix BM disposed on the second base substrate SUB2. The black matrix BM is overlapped with the gate line GLi, the data line DLj, the common line CL, and the thin film transistor TR. The black matrix BM includes a plurality of openings BM-OP corresponding to the transmission areas DA (refer to FIG. 1).

FIG. 4 shows one opening BM-OP corresponding to the pixel PXij. The opening BM-OP has a shape corresponding to that of the first electrode PE. The spacer CS is disposed to overlap with the thin film transistor TR.

As shown in FIGS. 5A and 5B, a first insulating thin layer 10 is disposed on the first base substrate SUB1 to cover the gate electrode GE. The first insulating thin layer 10 may include silicon nitride or silicon oxide, but is not limited thereto or thereby.

The semiconductor layer SC is disposed on the first insulating thin layer 10. The semiconductor layer SC is overlapped with the gate electrode GE while interposing the first insulating layer 10 therebetween. The semiconductor layer SC may include a single layer structure or a multi-layer structure. In one exemplary embodiment, for example, the semiconductor layer SC includes an active layer (not shown), and an ohmic contact layer (not shown) disposed on the active layer.

The source electrode SE and the drain electrode DE are disposed on the first insulating thin layer 10. The source electrode SE and the drain electrode DE are spaced apart from each other. Each of the source electrode SE and the drain electrode DE is overlapped with the semiconductor layer SC.

A second insulating thin layer 20 is disposed on the first insulating thin layer 10. The second electrode CE is disposed on the second insulating thin layer 20. A third insulating thin layer 30 is disposed on the second insulating thin layer 20 to cover the second electrode CE. The first electrode PE is disposed on the third insulating thin layer 30.

The first electrode PE is connected to the drain electrode DE through the first contact hole CH1 extended through thicknesses of the second insulating thin layer 20 and the third insulating thin layer 30. The second electrode CE is connected to the common line CL through the second contact hole CH2 extended through thicknesses of the first insulating thin layer 10 and the second insulating thin layer 20.

A protective layer 40 is disposed on the third insulating thin layer 30 to protect the first electrode PE. In addition, an alignment layer (not shown) of the first substrate 100 may be disposed on the protective layer 40. In an alternative exemplary embodiment, the protective layer 40 may be omitted.

The spacer CS is disposed on the protective layer 40. The spacer CS is attached to the protective layer 40. Since the spacer CS is attached to the protective layer 40, a position of the spacer CS is fixed and movement of the spacer CS with respect to the protective layer 40 is restricted or effectively prevented. The spacer CS is disposed to overlap with the thin film transistor TR, and thus a planar contact area between the spacer CS and the protective layer 40 is increased. The contact area between the spacer CS and the protective layer 40 is increased because the protective layer 40 disposed on the thin film transistor TR is stepped several times due to the profiles of underlying layers of the liquid crystal display panel. When the contact area between the spacer CS and the protective layer 40 is increased, the durability of the spacer CS may be improved.

The black matrix BM is disposed on the second base substrate SUB2. The black matrix BM may include an organic layer or an inorganic layer, which includes dyes or pigments, but is not limited thereto or thereby. In addition, the black matrix BM may include a metal material.

A color filter layer CF is disposed on the second base substrate SUB2. The color filter layer CF is disposed to correspond to the opening BM-OP of the black matrix BM. In addition, the color filter layer CF covers the black matrix BM. Further, an alignment layer (not shown) of the second substrate 200 may be disposed on the color filter layer CF.

The recessed portion CV is extended through a thickness portion of the color filter layer CF, such as by removing a portion of the color filter layer CF in a process of forming the liquid crystal display panel. A portion of the color filter layer CF adjacent to the recessed portion CV is overlapped with the black matrix BM. That is, the recessed portion CV exposes a portion of the black matrix BM. The exposed portion of the black matrix BM serves as the bottom surface BS of the recessed portion CV.

The portion of the color filter layer CF adjacent to the recessed portion CV serves as the sidewall SW of the recessed portion CV. The sidewall SW of the recessed portion CV is inclined from a bottom surface of the color filter layer CF to the bottom surface BS of the recessed portion CV, e.g., the exposed portion of the black matrix BM. A distance between opposing sidewall SW portions at the bottom surface BS is smaller than a distance between opposing sidewall SW portions at the bottom surface of the color filter layer CF, owing to the inclined sidewall SW.

The portion of the spacer CS is in the recessed portion CV. Accordingly, although external impacts are applied to the second substrate SUB2, the position of the spacer CS is not changed. In addition, although the spacer CS may deviate from an original position within the recessed portion CV by external impacts, the spacer CS easily returns to the original position by the inclined sidewall SW. Thus, since the spacer returns to the original position, liquid crystal molecules disposed adjacent to the spacer may be properly controlled and light leakage which may occur around the spacer, is reduced or effectively prevented.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:
1. A liquid crystal display device comprising:
a first substrate comprising:
  a liquid crystal capacitor connected to a thin film transistor, and
  an insulating layer which covers the liquid crystal capacitor and the thin film transistor to be stepped according to a profile of the thin film transistor;
a second substrate facing the first substrate and comprising a buffer layer in which a recessed portion thereof is defined;
a spacer between the first substrate and the second substrate, and partially extended into the recessed portion of the second substrate; and
a liquid crystal layer between the first substrate and the second substrate,
wherein
a bottom surface of the recessed portion contacts an upper surface of the spacer,
a lower surface of the spacer directly contacts the stepped insulating layer at the thin film transistor; and
a shortest line crossing a center of the bottom surface of the recessed portion is longer than a longest line crossing a center of the upper surface of the spacer, by about 14 micrometers to about 20 micrometers.

2. The liquid crystal display device of claim 1, wherein
the spacer has a truncated cone cross-sectional shape or a truncated polypyramid cross-sectional shape, in which an area of the lower surface of the spacer is greater than an area of the upper surface of the spacer.

3. The liquid crystal display device of claim 2, wherein the bottom surface of the recessed portion has a similar shape to the upper surface of the spacer.

4. The liquid crystal display device of claim 3, wherein the recessed portion comprises a sidewall inclined to the bottom surface of the recessed portion.

5. The liquid crystal display device of claim 3, wherein the center of the upper surface of the spacer coincides with the center of the bottom surface of the recessed portion.

6. The liquid crystal display device of claim 1, wherein the first substrate further comprises:
a gate line;
a data line insulated from the gate line and crossing the gate line; and
a pixel connected to the gate line and the data line.

7. The liquid crystal display device of claim 6, wherein the pixel comprises:
the thin film transistor connected to the gate line and the data line.

8. The liquid crystal display device of claim 7, wherein the liquid crystal capacitor comprises a first electrode connected to a drain electrode of the thin film transistor, and a second electrode insulated from the first electrode.

9. The liquid crystal display device of claim 8, wherein
the first electrode and the second electrode are in different layers of the liquid crystal display device, and overlap each other, and
a slit is defined in the first electrode.

10. The liquid crystal display device of claim 6, wherein the buffer layer comprises:
a black matrix, and an opening defined in the black matrix and corresponding to the pixel; and
a color filter layer which covers the black matrix.

11. The liquid crystal display device of claim 10, wherein
the recessed portion extends into the color filter layer,
a portion of the color filter layer adjacent to the recessed portion overlaps with the black matrix,
an exposed portion of the black matrix is the bottom surface of the recessed portion, and
the portion of the color filter layer adjacent to the recessed portion is a sidewall of the recessed portion.

12. A liquid crystal display device comprising:
a first substrate comprising:
  a liquid crystal capacitor connected to a thin film transistor, and
  an insulating layer which covers the liquid crystal capacitor and the thin film transistor to be stepped according to a profile of the thin film transistor;
a second substrate facing the first substrate and comprising a buffer layer in which a recessed portion is defined;
a spacer on the first substrate and comprising an upper surface, the spacer partially extending into the recessed portion of the second substrate; and
a liquid crystal layer between the first substrate and the second substrate,
wherein
the upper surface of the spacer contacts a bottom surface of the recessed portion, and
a lower surface of the spacer directly contacts the stepped insulating layer at the thin film transistor; and
a border of the bottom surface of the recessed portion is spaced apart from a border of the upper surface of the spacer, by about 7 micrometers to about 10 micrometers.

13. The liquid crystal display device of claim 1, wherein a center of the upper surface of the spacer coincides with a center of the bottom surface of the recessed portion.

14. The liquid crystal display device of claim 13, wherein the spacer has a truncated cone cross-sectional shape or a truncated polypyramid cross-sectional shape, in which an area of the lower surface of the spacer is greater than an area of the upper surface of the spacer.

15. The liquid crystal display device of claim 14, wherein the bottom surface of the recessed portion has a similar shape to the upper surface of the spacer.

16. The liquid crystal display device of claim 15, wherein the recessed portion comprises a sidewall inclined to the bottom surface of the recessed portion.

* * * * *